United States Patent
Iizuka et al.

(10) Patent No.: US 12,493,757 B2
(45) Date of Patent: Dec. 9, 2025

(54) DETECTING SYSTEM, DETECTING APPARATUS, DETECTING METHOD, AND PROGRAM

(71) Applicant: NTT, Inc., Tokyo (JP)

(72) Inventors: Tatsuya Iizuka, Musashino (JP); Go Itami, Musashino (JP); Naoko Kosaka, Musashino (JP); Masato Maruyama, Musashino (JP); Toshimitsu Tanaka, Musashino (JP); Jun Kato, Musashino (JP)

(73) Assignee: NTT, Inc., Tokyo (JP)

( * ) Notice: Subject to any disclaimer, the term of this patent is extended or adjusted under 35 U.S.C. 154(b) by 77 days.

(21) Appl. No.: 18/289,689

(22) PCT Filed: May 17, 2021

(86) PCT No.: PCT/JP2021/018598
§ 371 (c)(1),
(2) Date: Nov. 6, 2023

(87) PCT Pub. No.: WO2022/244053
PCT Pub. Date: Nov. 24, 2022

(65) Prior Publication Data
US 2024/0256801 A1 Aug. 1, 2024

(51) Int. Cl.
*G06K 7/10* (2006.01)
*G01S 13/58* (2006.01)
*G01S 7/02* (2006.01)
*G01S 13/90* (2006.01)

(52) U.S. Cl.
CPC ........ *G06K 7/10009* (2013.01); *G01S 13/583* (2013.01); *G01S 7/025* (2013.01); *G01S 13/90* (2013.01)

(58) Field of Classification Search
CPC ........ G06K 7/10009; G06K 7/08; G06K 7/10; G01S 13/583; G01S 7/025; G01S 13/90
See application file for complete search history.

(56) References Cited

U.S. PATENT DOCUMENTS

| | | | |
|---|---|---|---|
| 2012/0083218 A1* | 4/2012 | Gossain | ................. H04B 17/23 455/67.11 |
| 2017/0254898 A1* | 9/2017 | Park | ...................... G01S 13/584 |
| 2021/0063560 A1* | 3/2021 | Bosse | ..................... G01S 13/60 |

OTHER PUBLICATIONS

Herrojo et al., "Chipless-RFID: A Review and Recent Developments," Sensors, Aug. 2019, 19(15):3385, 20 pages.

* cited by examiner

*Primary Examiner* — Vernal U Brown
(74) *Attorney, Agent, or Firm* — Fish & Richardson P.C.

(57) ABSTRACT

A detecting system includes a tag, a radar device that transmits transmission radio waves to the tag and acquires reception radio waves produced by the transmission radio waves being reflected by the tag, and a detecting apparatus. The tag includes a pattern made of a plurality of materials that reflect or scatter radio waves received from the radar device, and the pattern includes a known pattern known to the detecting apparatus and an unknown pattern unknown to the detecting apparatus. The detecting apparatus includes a specifying unit that calculates a relative velocity between the radar device and the tag, with which the known pattern can be detected from the reception radio waves, and specifies a condition for the radar device to transmit transmission radio waves for estimating the unknown pattern, from the calculated relative velocity, and a notification unit that notifies the radar device of the specified condition.

10 Claims, 8 Drawing Sheets

[Fig. 1]
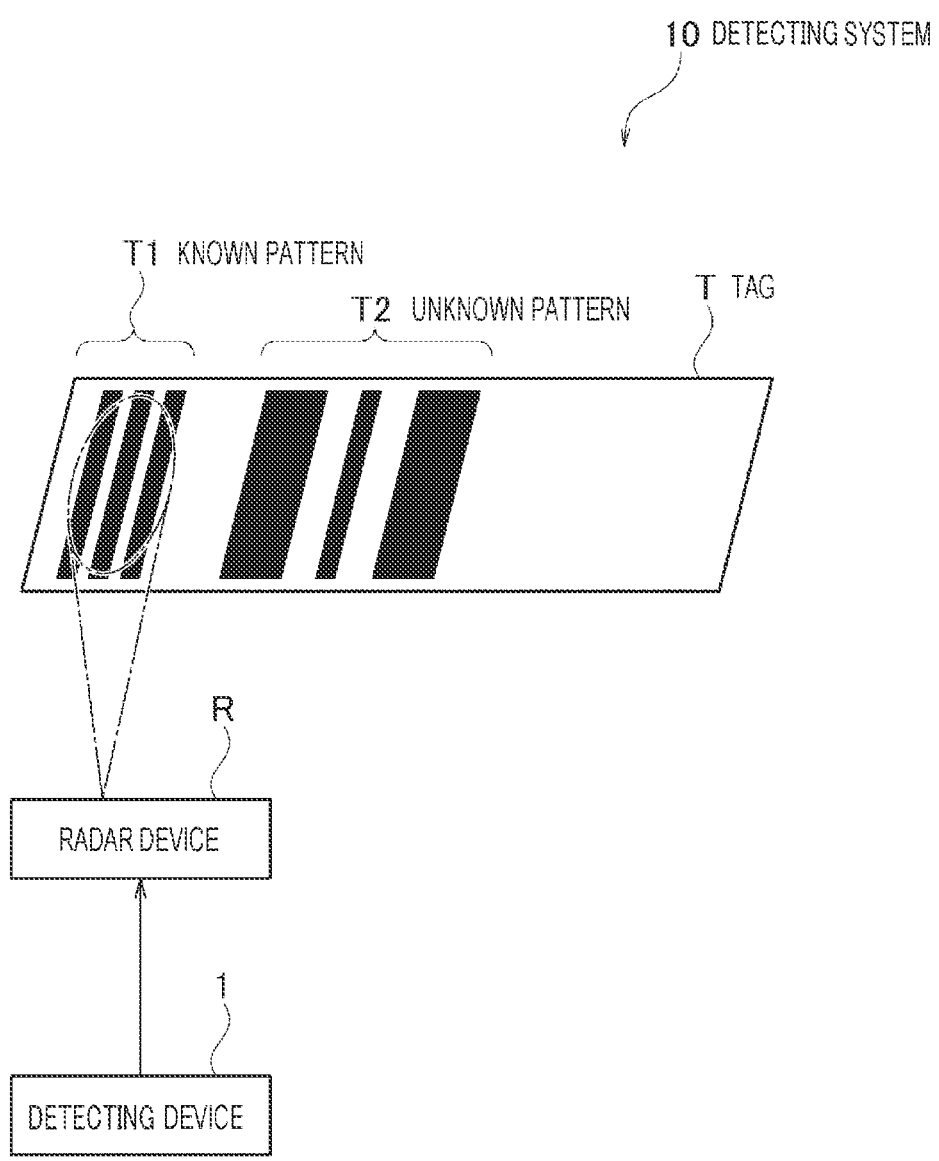

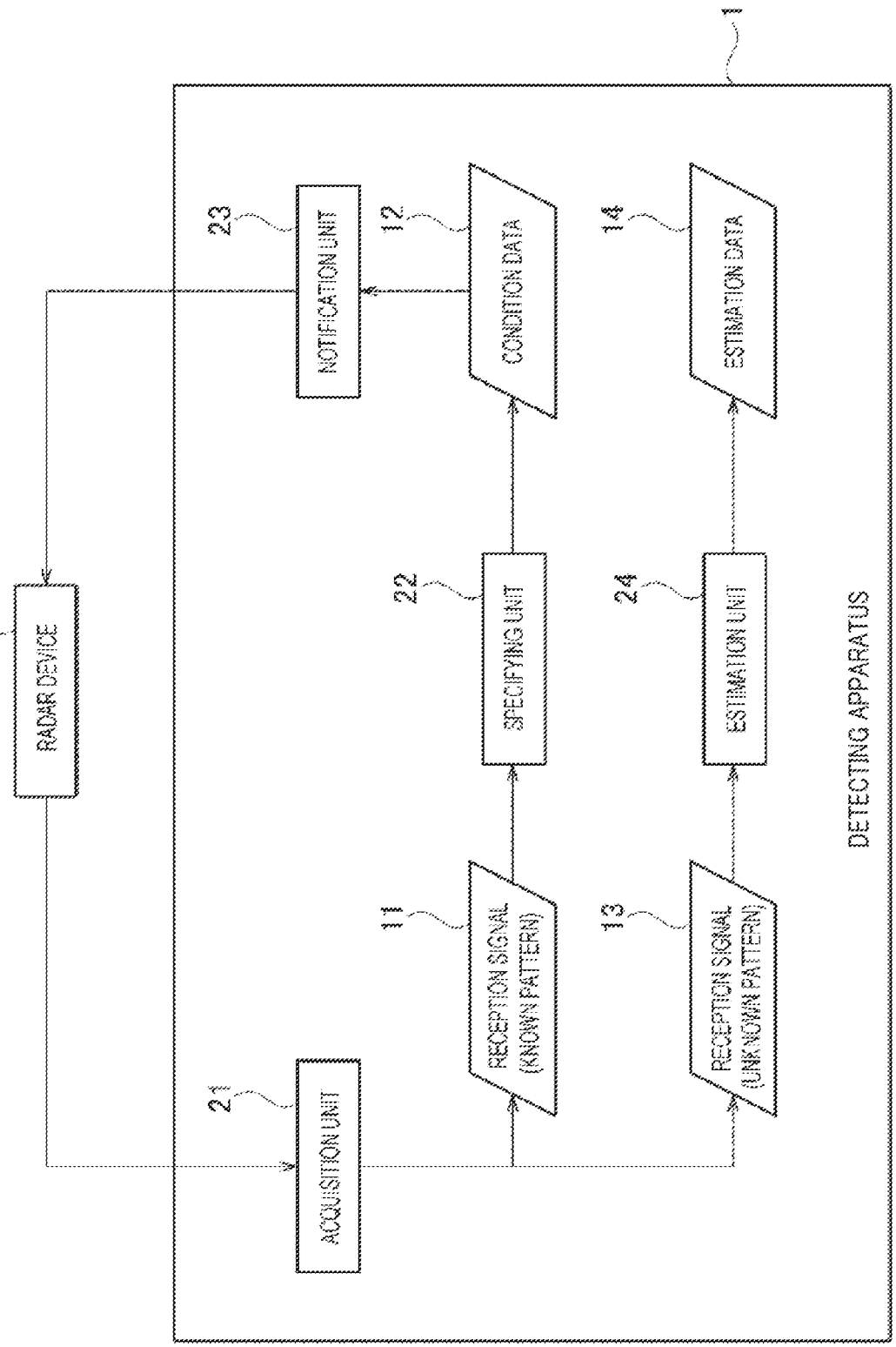

[Fig. 3]
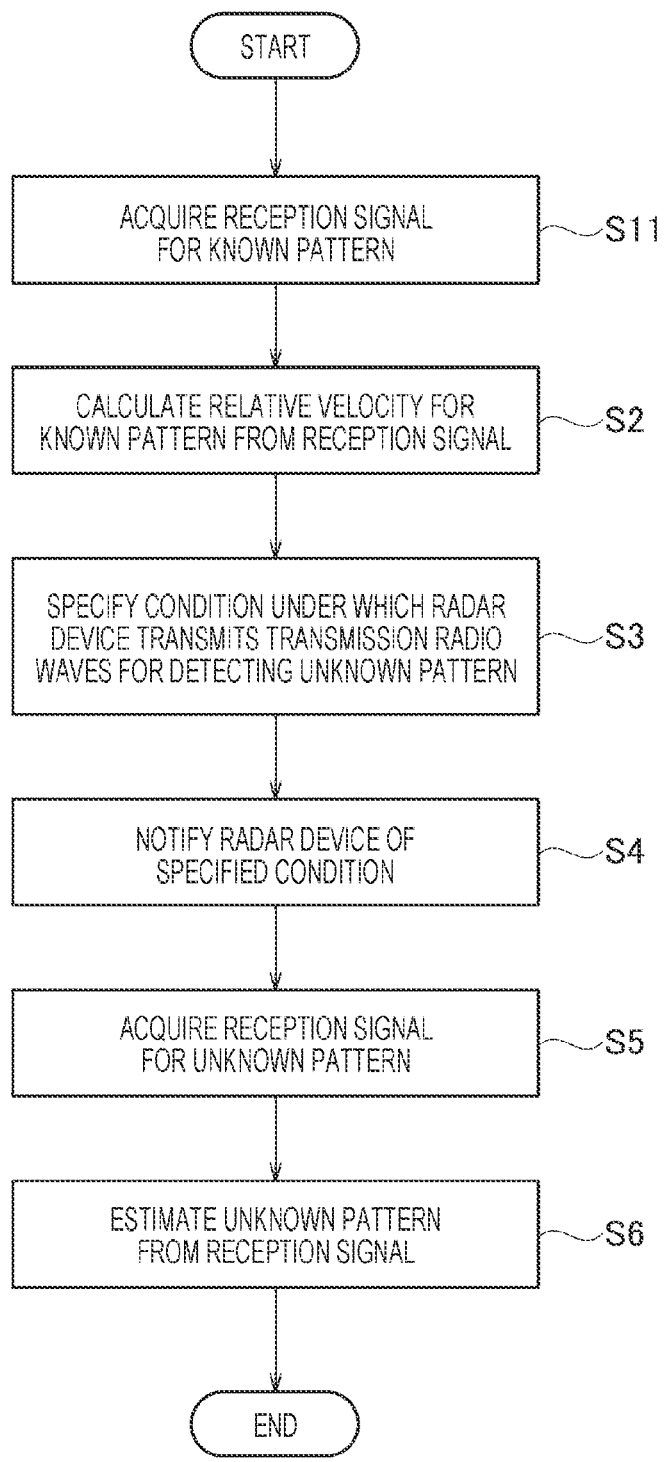

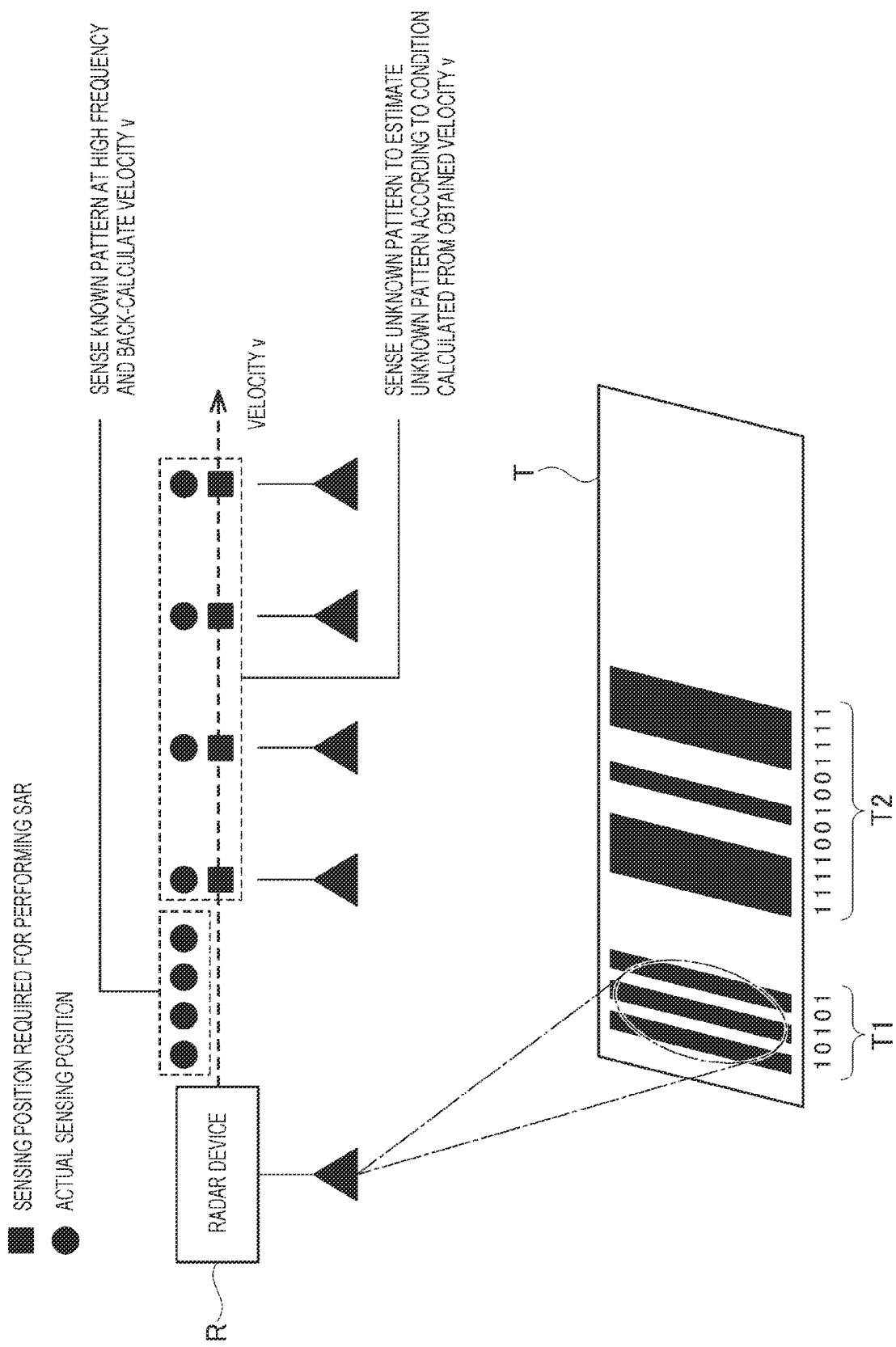

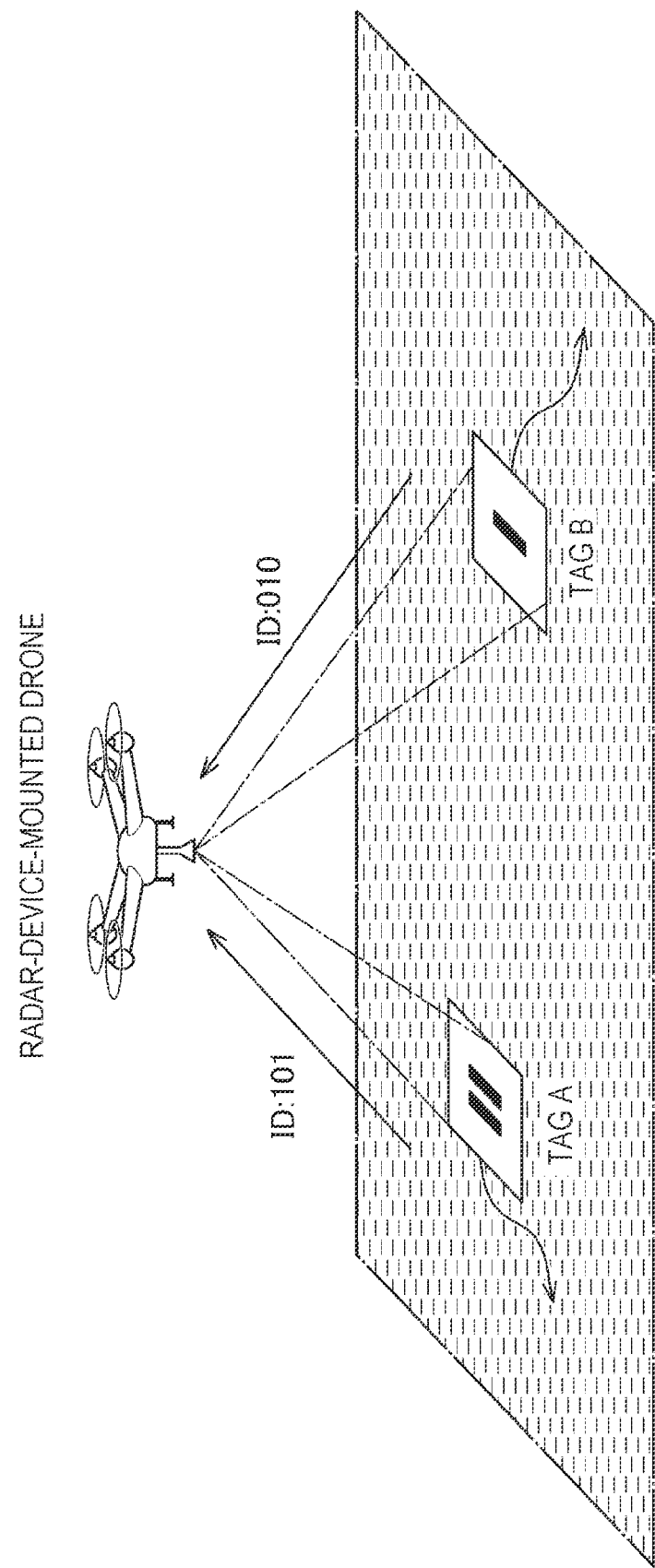

[Fig. 6]
(a)
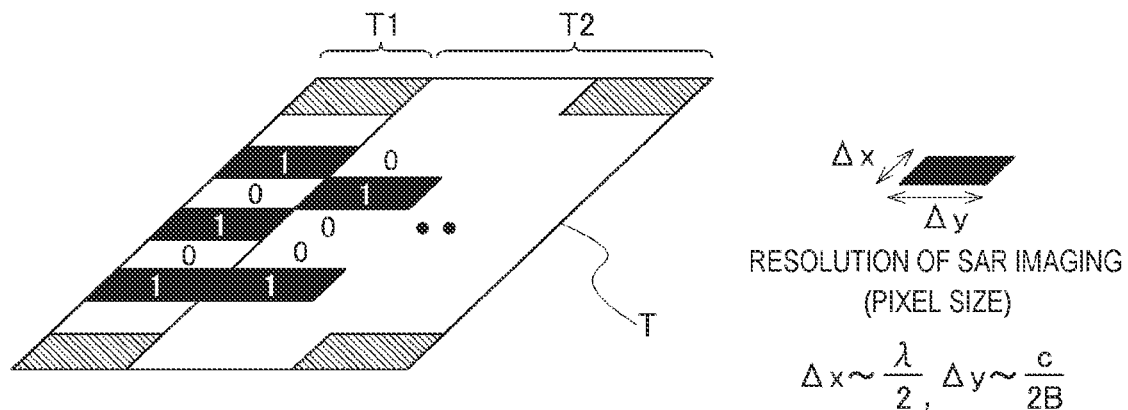
(b)
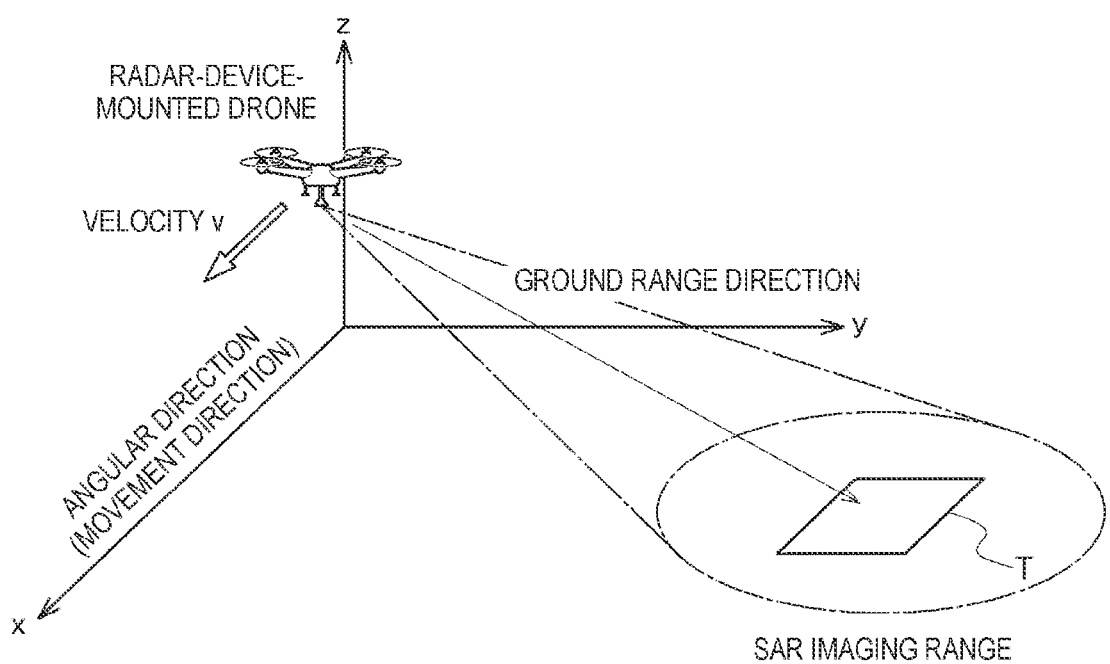

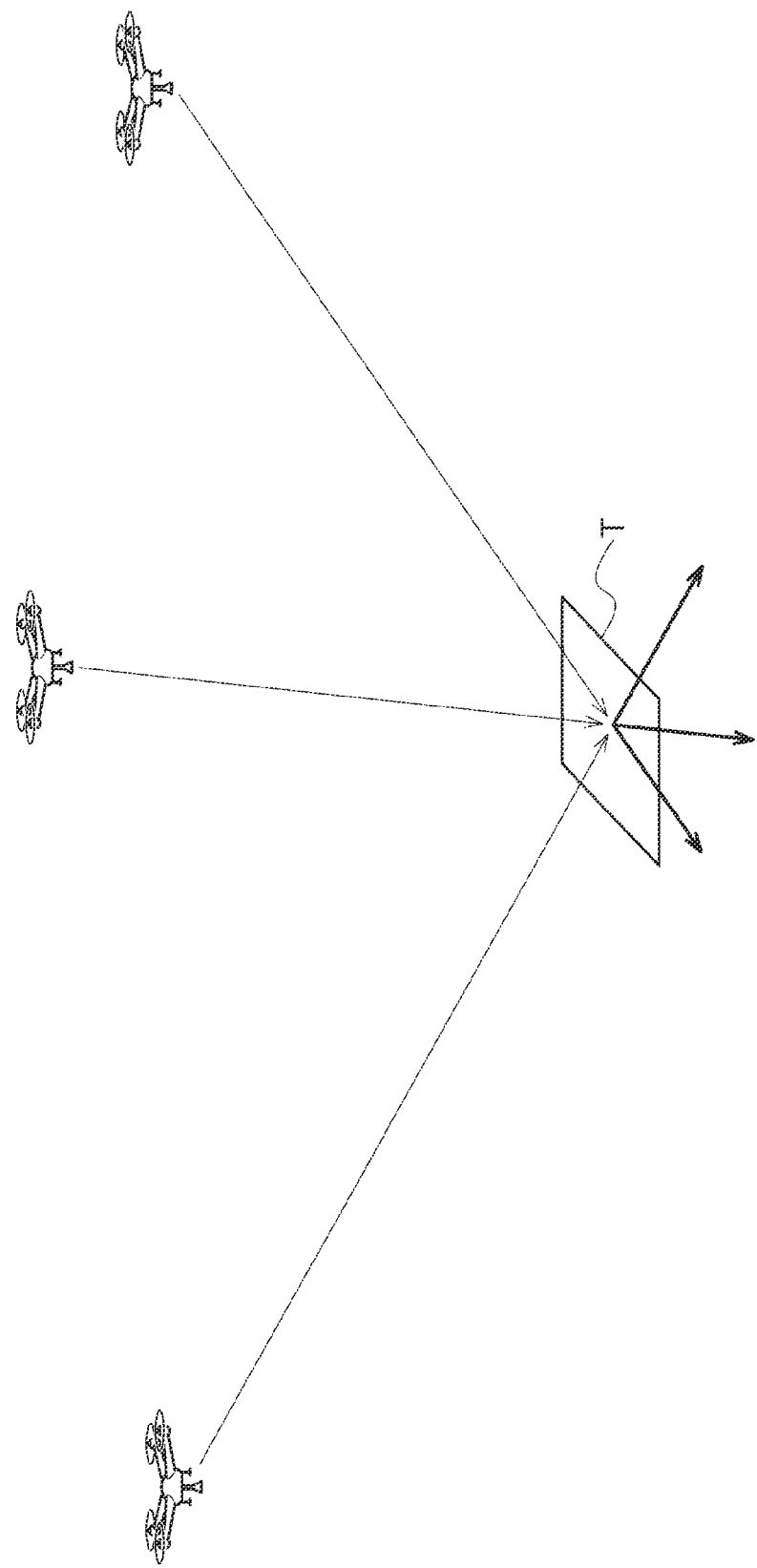
[Fig. 7]

[Fig. 8]
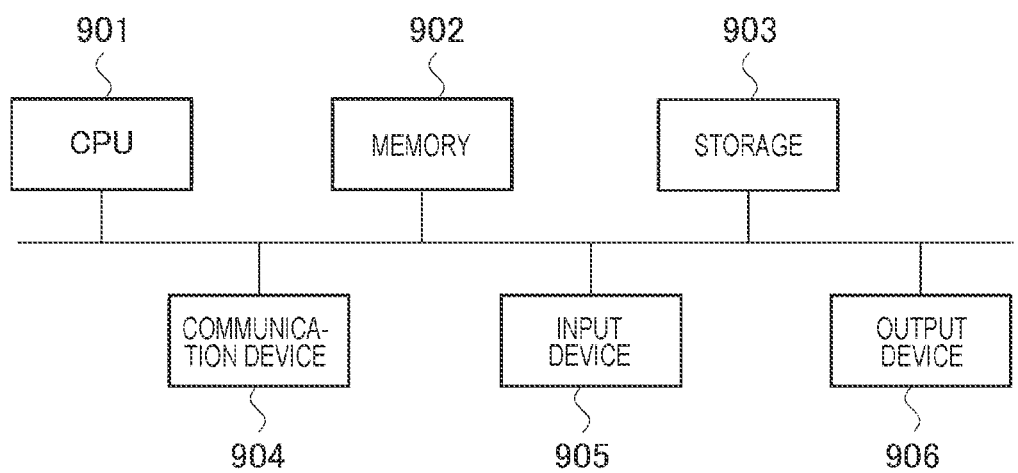

DETECTING SYSTEM, DETECTING APPARATUS, DETECTING METHOD, AND PROGRAM

CROSS-REFERENCE TO RELATED APPLICATIONS

This application is a National Stage application under 35 U.S.C. § 371 of International Application No. PCT/JP2021/018598, having an International Filing Date of May 17, 2021.
The disclosure of the prior application is considered part of the disclosure of this application, and is incorporated by reference in its entirety into this application.

TECHNICAL FIELD

The present invention relates to a detecting system, a detecting apparatus, a detecting method, and a program.

BACKGROUND ART

Recently, chipless RFID has attracted attention (Non-Patent Literature 1). Chipless RFID is a radio frequency identifier (RFID) that can be realized without an integrated circuit (IC). The chipless RFID is being anticipated as an environmentally friendly technology that can perform sensing with radio waves.

Sensing of chipless RFID is realized by applying a synthetic aperture radar (SAR) imaging technology. The SAR imaging technology is used in a satellite microwave sensing technology and the like. A chipless RFID tag makes it possible to identify an object shape of the tag and radio waves reflection characteristics with high resolution.

A pattern that enables specification of an ID or the like of the tag is provided on the chipless RFID tag. The pattern is made of a plurality of materials that reflect or scatter transmission radio waves emitted by a radar device. The pattern provided on the chipless RFID tag is estimated from reception radio waves obtained from the chipless RFID tag, and an ID of the chipless RFID is estimated from the estimated pattern. When the pattern included on the chipless RFID is estimated, a relative velocity between the chipless RFID tag and the radar device is referred to.

CITATION LIST

Non-Patent Literature

Non-Patent Literature 1: H, Cristian, et al., "Chipless-RFID: a review and recent developments." Sensors 2019, 19, 3385

SUMMARY OF INVENTION

Technical Problem

However, if a relative velocity between a chipless RFID tag and a radar device is unknown, there is a problem that a pattern provided on the chipless RFID tag cannot be estimated by using the SAR imaging technology.

The present invention has been devised in view of the above circumstances, and an object of the present invention is to provide a technique capable of estimating a pattern provided on a chipless RFID tag even if a relative velocity between the chipless RFID tag and a radar device is unknown.

Solution to Problem

According to an aspect of the present invention, there is provided a detecting system including: a tag; a radar device that transmits transmission radio waves to the tag and acquires reception radio waves produced by the transmission radio waves being reflected by the tag; and a detecting apparatus connected to the radar device, in which the tag includes a pattern made of a plurality of materials that reflect or scatter radio waves received from the radar device, the pattern including a known pattern known to the detecting apparatus and an unknown pattern unknown to the detecting apparatus, the detecting apparatus includes a specifying unit that calculates a relative velocity between the radar device and the tag, with which the known pattern can be detected from the reception radio waves, and specifies a condition for the radar device to transmit transmission radio waves for estimating the unknown pattern, from the calculated relative velocity; and a notification unit that notifies the radar device of the specified condition, and the radar device transmits the transmission radio waves to the tag under the condition.

According to another aspect of the present invention, there is provided a detecting apparatus including: a specifying unit that calculates a relative velocity between a radar device and a tag, with which a known pattern can be detected from reception radio waves produced by transmission radio waves from the radar device being reflected or scattered, the tag including a pattern made of a plurality of materials that reflect or scatter received radio waves, the pattern including a known pattern known to the detecting apparatus and an unknown pattern unknown to the detecting apparatus, and specifies a condition for the radar device to transmit transmission radio waves for estimating the unknown pattern, from the calculated relative velocity; and a notification unit that notifies the radar device of the specified condition.

According to still another aspect of the present invention, there is provided a detecting method in a detecting system including a tag, a radar device that transmits transmission radio waves to the tag and acquires reception radio waves produced by the transmission radio waves being reflected by the tag, and a detecting apparatus connected to the radar device, in which the tag including a pattern made of a plurality of materials that reflect or scatter radio waves received from the radar device, the pattern including a known pattern known to the detecting apparatus and an unknown pattern unknown to the detecting apparatus, the detecting method including: the detecting apparatus calculating a relative velocity between the radar device and the tag, with which the known pattern can be detected from the reception radio waves, and specifying a condition for the radar device to transmit transmission radio waves for estimating the unknown pattern, from the calculated relative velocity; the detecting apparatus notifying the radar device of the specified condition; and the radar device transmitting transmission radio waves to the tag under the condition.

According to still another aspect of the present invention, there is provided a program for causing a computer to function as the detecting apparatus.

Advantageous Effects of Invention

According to the present invention, it is possible to provide a technique capable of estimating a pattern provided on a chipless RFID tag even if a relative velocity between the chipless RFID tag and a radar device is unknown.

BRIEF DESCRIPTION OF DRAWINGS

FIG. 1 is a diagram for explaining the configuration of a detecting system according to an embodiment of the present invention.

FIG. 2 is a diagram for explaining functional blocks of a detecting apparatus according to the embodiment of the present invention.

FIG. 3 is a flowchart illustrating an example of the operation of the detecting apparatus.

FIG. 4 is a diagram for explaining an example of a process in which a radar device applies transmission radio waves and calculates a velocity.

FIG. 5 is a diagram for explaining an example of detecting a tag floating on the sea surface.

FIG. 6 is a diagram for explaining an example in which a tag has a pattern in a two-dimensional direction.

FIG. 7 is a diagram for explaining an example of specifying a velocity of a tag in a three-dimensional direction.

FIG. 8 is a diagram for explaining a hardware configuration of a computer used for the detecting apparatus.

DESCRIPTION OF EMBODIMENTS

An embodiment of the present invention will be described below with reference to the drawings. In the drawings, the same parts are denoted by the same reference numerals, and description thereof will be omitted.
(Detecting System)

A detecting system 10 according to the embodiment of the present invention includes a tag T, a radar device R, and a detecting apparatus 1.

The tag T is what is known as a chipless RFID tag. The detecting system 10 may include a plurality of tags T. The tag T has a pattern made of a plurality of materials that reflects or scatters radio waves received from the radar device R. The characteristics of reflecting or scattering radio waves vary depending on each material. The pattern is formed by positions where a plurality of materials is provided on a surface of the tag T.

The pattern may be formed by providing a predetermined material on a base material of the tag T. The predetermined material is formed on the base material according to any method such as printing or bonding. Both a material of the base material and a material provided on the base material can reflect or scatter radio waves. The material provided on the base material has reflection characteristics or scattering characteristics different from those of the base material. By providing a material having reflection characteristics or scattering characteristics different from those of the base material on a part of the base material of the tag T, the detecting system 10 can estimate a position at which the material different from the base material is provided from radio waves reflected or scattered by the tag T. The detecting system 10 can estimate the pattern formed on the tag T from the position at which the material is provided.

The pattern formed on the tag T can express various pieces of data depending on a position of a material provided on the base material. For example, if a portion where the material is provided is defined as "1" and a portion where the material is not provided and the base material is exposed is defined as "0", the pattern can express various pieces of data with binary values of "1" and "0".

The radar device R transmits transmission radio waves to the tag T and acquires reception radio waves produced by the transmission radio waves being reflected by the tag T. The radar device R applies radio waves to the tag T from an antenna. The tag T reflects or scatters the applied radio waves. The radar device R receives reception radio waves produced by the transmission radio waves being reflected or scattered by the tag T. The pattern provided on the tag T is estimated from the reception radio waves. The SAR imaging technology is used for pattern estimation.

The radar device R relatively moves around the tag T while maintaining a predetermined distance from the tag T. The radar device R irradiates the tag T with vertically polarized waves (transmission radio waves) at a predetermined distance interval during movement. The predetermined distance interval is ½ of a wavelength of the vertically polarized waves transmitted by the radar device R by means of the SAR imaging technology. The radar device R irradiates the tag T with vertically polarized waves at a predetermined distance interval in consideration of a relative velocity between the tag T and the radar device R.

The tag T reflects or scatters the vertically polarized waves and returns the horizontally polarized waves to the radar device R. The radar device R detects the horizontally polarized waves (reception radio waves) returned from the tag T. The detected horizontally polarized waves are digitized into a signal. The horizontally polarized waves signal is used for estimation of a pattern provided on the tag T by means of the SAR imaging technology.

The detecting apparatus 1 is connected to the radar device R. The detecting apparatus 1 processes a reception signal obtained by converting reception radio waves received by the radar device R into data. It is sufficient if the detecting apparatus 1 can refer to the reception signal of the reception radio waves received by the radar device R, and means thereof is not questioned. In the embodiment of the present invention, a description is given regarding a case where the detecting apparatus 1 acquires a reception signal from the radar device R, but the detecting apparatus 1 may generate a reception signal by referring to reception radio waves.

In the embodiment of the present invention, a description is given regarding a case where the detecting apparatus 1 is mounted in a casing different from that of the radar device R and transmits and receives data to and from the radar device R through communication, but the present invention is not limited thereto. For example, the detecting apparatus 1 may be mounted in the radar device R and transmit and receive data to and from the radar device R via an internal bus or the like from the radar device R.

In the embodiment of the present invention, the pattern provided on the tag T includes a known pattern T1 known to the detecting apparatus 1 and an unknown pattern T2 unknown to the detecting apparatus 1.

The known pattern T1 is a pattern in which the detecting apparatus 1 apprehends in advance that the pattern is provided on the tag T. The detecting apparatus 1 stores data for specifying the known pattern T1 of the tag T. The number of known patterns T1 used in the detecting system 10 may be one or more.

The unknown pattern T2 is a pattern in which the detecting apparatus 1 does not apprehend in advance that the pattern is provided on the tag T. The detecting apparatus 1 estimates the unknown pattern T2 from the reception radio waves from the tag T. The unknown pattern T2 represents, for example, an identifier of the tag T. The unknown pattern T2 may be a pattern included in a general chipless RFID tag.
(Detecting Apparatus)

The detecting apparatus 1 according to an embodiment of the present invention will be described with reference to FIG. 2. The detecting apparatus 1 specifies a condition for the radar device R to transmit transmission radio waves for detecting the unknown pattern T2 from a reception signal 11 for detecting the known pattern T1, and notifies the radar device R of the condition. The detecting apparatus 1 estimates the unknown pattern T2 from the reception signal 13 for the transmission radio waves transmitted under the condition notified to the radar device R and outputs the pattern.

The detecting apparatus 1 includes each piece of data of reception signals 11 and 13, condition data 12, and estimation data 14, and each function of a specifying unit 22, a notification unit 23, and an estimation unit 24. Each piece of data is stored in a memory 902 or a storage 903. Each function is realized by a CPU 901.

The reception signals 11 and 13 are signals in which the radar device R irradiates the tag T with transmission radio waves and receives reception radio waves from the tag T. The reception signals 11 and 13 have a format of data that can be processed by the detecting apparatus 1.

The reception signal 11 is a signal of reception radio waves for transmission radio waves transmitted from the radar device R in order to detect the known pattern T1. In order to detect the known pattern T1, the radar device R irradiates the tag T at a predetermined frequency and obtains reception radio waves. The reception signal 11 is a signal of the reception radio waves obtained in this way. The predetermined frequency is, for example, any or default frequency designated by the radar device R or the detecting apparatus 1. By the predetermined frequency being a distance interval of ½ or less of a wavelength of the transmission radio waves, analysis using the SAR imaging technology can be performed. Due to an irradiation frequency for obtaining the known pattern T1 being higher than an irradiation frequency for obtaining the unknown pattern T2, it is possible to increase a possibility of irradiating the known pattern T1 at a detectable position, and thus the known pattern T1 can be efficiently detected.

The reception signal 13 is a signal of reception radio waves for transmission radio waves transmitted from the radar device R in order to detect the unknown pattern T2. The radar device R is notified of a condition for detecting the unknown pattern T2 from the detecting apparatus 1. The radar device R irradiates the tag T with transmission radio waves according to the condition notified from the detecting apparatus 1. The reception signal 13 is a signal of reception radio waves for transmission radio waves transmitted according to the condition notified from the detecting apparatus 1.

The condition data 12 is data for specifying a condition for the radar device R to transmit transmission radio waves for estimating the unknown pattern T2. The condition data 12 is specified by the specifying unit 22 and notified to the radar device R by the notification unit 23.

The condition specified with the condition data 12 is a condition for the radar device R to irradiate the tag T with transmission radio waves at a predetermined distance interval while maintaining a predetermined distance to the tag T in order to detect the unknown pattern T2. The predetermined distance interval is ½ of a wavelength of the transmission radio waves. The condition may be a position at which the radar device R applies the transmission radio waves or a time at which the radar device R applies the transmission radio waves. Further, the condition may be expressed by a plurality of parameters such as position and time.

The estimation data 14 is data for specifying a pattern estimated from the reception signal 13 for detecting the unknown pattern T2. The estimation data 14 is generated by the estimation unit 24.

The acquisition unit 21 acquires the reception signals 11 and 13 from the radar device R. The acquisition unit 21 may generate the reception signals 11 and 13 by referring to reception radio waves of the radar device R.

The specifying unit 22 calculates a relative velocity between the radar device R and the tag T used for detecting the known pattern T1 from the reception signal 11 of the reception radio waves. The specifying unit 22 specifies a condition for the radar device R to transmit transmission radio waves for estimating the unknown pattern T2 from the calculated relative velocity.

The specifying unit 22 calculates a relative velocity between the radar device R and the tag T used for detecting the known pattern T1 in the reception signal 11. The specifying unit 22 back-calculates the relative velocity between the radar device R and the tag T such that a pattern synthesized from the reception signal 11 becomes the known pattern T1.

After the relative velocity between the radar device R and the tag T is calculated, the specifying unit 22 specifies a condition for the radar device R to apply transmission radio waves for estimating the unknown pattern T2 using the calculated relative velocity. Since the radar device R uses the SAR imaging technology, it is necessary to irradiate the tag T with vertically polarized waves at a distance interval of ½ of the wavelength of the vertically polarized waves applied by the radar device R. The specifying unit 22 specifies a condition related to an irradiation timing, such as a position and time to apply the vertically polarized waves, from the relative velocity between the radar device R and the tag T such that the radar device R can apply the vertically polarized waves at a distance interval of ½ of the wavelength of the vertically polarized waves.

The specifying unit 22 stores the specified condition as the condition data 12.

The notification unit 23 notifies the radar device R of the condition specified by the specifying unit 22. The notification unit 23 inputs the condition data 12 to the radar device R. The radar device R irradiates the tag T with transmission radio waves under the condition specified with the condition data 12. This enables the radar device R to irradiate the tag T with vertically polarized waves at a distance interval of ½ of the wavelength of the vertically polarized waves, even if a relative distance between the radar device R and the tag T is unclear.

The estimation unit 24 estimates the unknown pattern T2 from the reception signal 13 of the reception radio waves for the transmission radio waves transmitted under the condition specified with the condition data 12. The estimation unit 24 refers to the reception signal 13 and estimates the unknown pattern T2 by performing an SAR imaging process. The estimation unit 24 outputs the estimated pattern as the estimation data 14.

A detecting method according to the embodiment of the present invention will be described with reference to FIGS. 3 and 4. In FIG. 4, a "circular mark" indicates positions of the radar device R transmitting transmission radio waves. A "square mark" indicates positions of the radar device R transmitting transmission radio waves in order to detect the unknown pattern T2.

In step S1, the detecting apparatus 1 acquires the reception signal 11 for detecting the known pattern T1. The reception signal 11 is obtained by the radar device R irradiating the tag T with transmission radio waves.

In step S2, the detecting apparatus 1 back-calculates a relative velocity v at which the known pattern T1 can be reproduced from the reception signal 11. As illustrated in FIG. 4, the radar device R performs sensing at a high frequency in order to detect the known pattern T1, and obtains reception radio waves. The detecting apparatus 1 back-calculates the relative velocity v such that the known pattern can be synthesized from reception signal 11 of the reception radio waves.

In step S3, the detecting apparatus 1 specifies a condition for the radar device R to transmit transmission radio waves for detecting the unknown pattern T2 using the relative velocity v obtained through back calculation. Here, a description will be given regarding a case where the position of the "square mark" illustrated in FIG. 4 is specified as a condition for transmitting transmission radio waves. In step S4, the detecting apparatus 1 notifies the radar device R of the condition specified in step S3. The radar device R applies transmission radio waves for sensing the unknown pattern T2 at the position of the "square mark" illustrated in FIG. 4, according to the notified condition and obtains reception radio waves. A distance between the two "square marks" illustrated in FIG. 4 is λ/2 (where λ=wavelength of transmission radio waves).

In step S5, the detecting apparatus 1 acquires the reception signal 13 of the reception radio waves for the transmission radio waves applied under the condition specified in step S3. In step S6, the detecting apparatus 1 estimates the unknown pattern T2 from the reception signal 13 acquired in step S5 using the SAR imaging technology, and outputs the estimation data 14.

The detecting system 10 according to the embodiment of the present invention estimates a relative velocity between the tag T and the radar device R from the known pattern T1 prior to the estimation of the unknown pattern T2 of the tag T. The detecting system 10 calculates a relative velocity at which the known pattern T1 can be reproduced from reception radio waves obtained by irradiating the tag T with transmission radio waves at a predetermined frequency. The detecting system 10 specifies a condition for transmitting transmission radio waves to the unknown pattern T2, based on the calculated relative velocity. According to the specified condition, the radar device R irradiates the tag T with transmission radio waves.

This kind of detecting system 10 can estimate the unknown pattern T2 provided on the tag T even if a relative velocity between the tag T and the radar device R is unknown.

First Application Example

In the embodiment of the present invention, the detecting apparatus 1 calculates a relative velocity between the tag T and the radar device R. Here, if the tag T is fixed, the relative velocity calculated by the specifying unit 22 is a velocity of the radar device R.

In the first application example, the tag T is fixed at a predetermined position and includes a known pattern T1 and an unknown pattern T2. The radar device R irradiates the tag T with transmission radio waves while moving around the tag T and obtains reception radio waves. The detecting system 10 calculates a relative velocity at which the known pattern T1 is obtained, from the obtained reception radio waves. Since the tag T is fixed, the calculated relative velocity is a velocity of the radar device R.

Further, the detecting system 10 refers to the velocity of the radar device R and specifies a condition for the radar device R to irradiate the tag T. The detecting system 10 specifies a condition for the radar device R to irradiate the tag T with vertically polarized waves transmitted by the radar device R at an interval of ½ of a wavelength of the vertically polarized waves. From horizontally polarized waves for the vertically polarized waves applied under this kind of condition, the detecting system 10 can reproduce the unknown pattern T2 provided on the tag T by performing SAR imaging analysis.

As described in the first application example, the detecting system 10 can be applied for calculation of a velocity of the radar device R without using a speedometer or the like that calculates the velocity of the radar device R by providing the known pattern T1 on the tag T in a situation in which the tag T is fixed.

Second Application Example

In the first application example, a case where the tag T is fixed has been described, but in the second application example, a case where the tag T is not fixed and moves will be described.

In a case where the tag T moves, the specifying unit 22 may further acquire a velocity of the radar device R and calculate a velocity of the tag T from the acquired velocity of the radar device R and a relative velocity.

In the second application example, the tag T moves without being fixed at a predetermined position, and includes a known pattern T1 and an unknown pattern T2. The radar device R irradiates the tag T with transmission radio waves while relatively moving around the tag T and obtains reception radio waves. The detecting system 10 calculates a relative velocity at which the known pattern T1 can be obtained, from the obtained reception radio waves. If the velocity of the radar device R is known, a movement velocity of the tag T can be calculated from the relative velocity calculated here.

The detecting system 10 refers to a relative velocity at which the known pattern T1 can be reproduced, and specifies a condition for the radar device R to irradiate the tag T. The detecting system 10 specifies a condition for the radar device R to irradiate the tag T with vertically polarized waves transmitted by the radar device R at an interval of ½ of a wavelength of the vertically polarized waves. From horizontally polarized waves for the vertically polarized waves applied under such a condition, the detecting system 10 can reproduce the unknown pattern T2 provided on the tag T by performing SAR imaging analysis.

The second application example can be applied for, for example, calculation of a velocity of an environment in which the tag T is provided. If the tag T floats in an environment, a velocity of the tag T calculated in the second application example is a movement velocity of the environment in which the tag T is located.

For example, as illustrated in FIG. 5, a tag A and a tag B float on a sea surface. The tag A and the tag B include a known pattern T1 (not illustrated) or an unknown pattern T2 for identifying the tag. The unknown pattern T2 of the tag A indicates "101". The unknown pattern T2 of the tag B indicates "010".

When the radar device R is mounted on a drone and the radar device R irradiates each tag with transmission radio waves, the detecting system 10 can calculate a relative velocity between the radar device R and each tag T. In a case where a velocity of the radar device R is measured by another system, the detecting system 10 can calculate a velocity of each tag.

The tag T illustrated in FIG. 5 floats and moves on the sea surface. The velocity of the tag T calculated by the detecting system 10 is a velocity of an ocean current.

The case of measuring a velocity of the sea surface has been described with reference to FIG. 5, but the present invention is not limited thereto. By providing the tag T on a surface of a river, the detecting system 10 can measure a velocity of the river. Further, by providing the tag T on a flow ice or the like, the detecting system 10 can measure a flow velocity of the flow ice.

As described above, it is preferable to install the tag T including the known pattern T1 in an environment from a plurality of viewpoints such as low cost, low environmental load, and enhancement of visibility. In the embodiment of the present invention, the tag T may include a pattern made of a plurality of materials that reflect or scatter radio waves received from the radar device R. The tag T does not require a conductive substance such as an antenna, and can be realized at low cost. The degree of freedom of a material of the tag T is high, and a low environmental load can be realized. Therefore, as illustrated in FIG. 5, by installing the tag T in an environment such as the sea, it is possible to measure an environment of the sea such as an ocean current at low cost and low environmental load. It is also possible to control the visibility of the tag T by adding a color with high visibility to the tag T or adding a color with low visibility to the tag T depending on an environment in which the tag T is installed. Further, by using the SAR imaging technology, a resolution is higher than that of conventional radar sensing, enhancement of a reading distance can also be expected, and therefore a state of an environment can be measured with high accuracy.

Third Application Example

Although the case where the pattern is one-dimensional has been described in the above examples and the like, a case where the pattern is two-dimensional in a third application example will be described with reference to FIG. 6.

In the examples illustrated in FIGS. 6(*a*) and 6(*b*), an x direction is an angular direction (a movement direction of a radar mounted drone), and a y direction is a ground range direction. The tag T is located obliquely downward of the radar mounted drone and moves two-dimensionally. The radar is, for example, a millimeter-wave frequency modulated continuous wave (FMCW) radar of 77 to 81 GHz.

As illustrated in FIG. 6(*a*), the tag T includes a known pattern T1 and an unknown pattern T2. The known pattern T1 and the unknown pattern T2 form a predetermined pattern with a plurality of materials that reflect or scatter radio waves from the radar device R. In the example illustrated in FIG. 1, each material is provided in one direction, but in the example illustrated in FIG. 6(*a*), each material is provided in two-dimensional directions such as the x direction and the y direction. One of the plurality of materials is a base material of the tag T. The base material is, for example, a radio wave absorbing sheet. One of the plurality of materials is a material provided on the base material of the tag T, and is, for example, carbon.

A size of a portion where each material is provided depends on a resolution of the SAR imaging.

In the x direction, the pattern is measured through SAR imaging. A resolution $\Delta x$ in the x direction is $\lambda/2$ (where $\lambda$=wavelength of transmission radio waves). In the y direction, a pattern is measured by a ranging frequency modulated continuous wave (FMCW) radar. A resolution $\Delta y$ in the y direction is $c/2B$ (where c=velocity of light, and B=bandwidth used by the ranging FMCW radar).

Here, in a case where $\Delta x$=2 mm and $\Delta y$=37.5 mm, 1-bit information of the unknown pattern T2 is expressed by 75 $mm^2$. Therefore, in a case where the tag T has a size of 10 cm square (1000 $mm^2$), 133-bit data can be expressed. Even if the known pattern T1 is expressed by about 30 bits out of 133 bits, the tag T of 10 cm square can express the unknown pattern T2 of about 100 bits.

In the examples illustrated in FIGS. 6(*a*) and 6(*b*), the detecting system 10 can measure a movement velocity of the tag T moving in the two-dimensional directions.

Since the pattern of the tag T is measured in the x direction through SAR imaging, the detecting system 10 may set a velocity at which the known pattern T1 can be reproduced as a relative velocity between the radar device R and the tag T in the x direction. By separately acquiring a velocity of the radar device R in the x direction, the detecting system 10 can calculate a velocity of the tag T in the x direction. In the y direction, the detecting system 10 can estimate a relative velocity in the y direction by performing Doppler radar analysis. Further, the detecting system 10 can calculate a velocity of the tag T in the y direction by separately acquiring a velocity of the radar device R in the y direction.

Further, the detecting system 10 can specify a location where the known pattern T1 is detected as a position of the tag T.

The radar device R applies transmission radio waves to a range including the tag T. The radar device R receives reception radio waves reflected from the irradiation range. The detecting system 10 obtains a reflection intensity with respect to a distance in the x direction by analyzing the reception radio waves through SAR imaging. The detecting system 10 obtains a reflection intensity with respect to a distance in the y direction by analyzing a frequency of the reception radio waves.

The radar device R applies transmission radio waves while finely moving a position in the x direction, and acquires reception radio waves from the tag T. As a result, the detecting system 10 can specify the pattern in the x direction from a change in the reception radio waves in the x direction.

Fourth Application Example

Due to the radar device R using the beamforming technology, the detecting system 10 can efficiently detect a plurality of tags T from reception radio waves obtained by one radar device R.

For example, a direction for the radar device R to apply transmission radio waves is controlled by software or the like. The radar device R applies beams in various directions and acquires reception radio waves from each direction. The detecting system 10 can specify a relative velocity at which the known pattern T1 can be detected and a position of the known pattern T1 when the known pattern T1 can be detected from the acquired reception radio waves.

Fifth Application Example

In the third application example, it has been revealed that, when the tag T moves two-dimensionally, the detecting system 10 can measure a velocity in each of the angular direction and the ground range direction. Meanwhile, in a fifth application example, a description will be given regarding a method in which the detecting system 10 specifies a three-dimensional velocity vector when the tag T moves three-dimensionally.

As illustrated in FIG. 7, the radar device R is mounted on each of three drones moving above the tag T. The three drones move to different positions. Each radar device R measures a velocity in each of the ground range direction and the angular direction of the tag T. The detecting system 10 can obtain a three-dimensional velocity (Vx, Vy, Vz) of the tag T by synthesizing vectors of each of the measured velocities.

As described above, the detecting system 10 according to the embodiment of the present invention can specify a relative velocity at which the known pattern T1 can be reproduced from reception radio waves by providing the known pattern T1 on the tag T. Accordingly, even if a relative velocity between the radar device R and the tag T is unclear, the detecting system 10 can estimate the unknown pattern T2 of a chipless RFID by using the SAR imaging technology.

If a velocity of the radar device R is known, the detecting system 10 can calculate a movement velocity of the tag T. Conversely, if a movement velocity of the tag T is known, the detecting system 10 can calculate a velocity of the radar device R.

The pattern provided on the tag T may be made of a plurality of materials that reflect or scatter radio waves from the radar device R, and there are few restrictions on materials forming the pattern. Since a material for forming the tag T can be selected according to an environment in which the tag T is installed, this kind of tag T can be used for a wide range of applications. Further, since there are few restrictions on materials of the tag T, a shape, a design, a color, and the like of the tag T can be selected as appropriate according to an environment. Further, by forming the tag T by using an eco-friendly material, the collection cost of the tag T can be reduced.

The detecting apparatus 1 according to the present embodiment described above is, for example, a general-purpose computer system including a central processing unit (CPU, processor) 901, a memory 902, a storage 903 (a hard disk drive (HDD) or a solid state drive (SSD)), a communication device 904, an input device 905, and an output device 906. Each function of the detecting apparatus 1 is realized by the CPU 901 executing a program loaded on the memory 902 in the computer system.

The detecting apparatus 1 may be implemented by one computer or may be implemented by a plurality of computers. Further, the detecting apparatus 1 may be a virtual machine that is implemented by a computer.

The program for the detecting apparatus 1 can be stored in a computer-readable recording medium such as an HDD, an SSD, a universal serial bus (USB) memory, a compact disc (CD), or a digital versatile disc (DVD), or can be distributed via a network.

The present invention is not limited to the above embodiment, and various modifications can be made within the scope of the spirit of the present invention.

REFERENCE SIGNS LIST

1 Detecting apparatus
10 Detecting system
11, 13 Reception signal
12 Condition data
14 Estimation data
21 Acquisition unit
22 Specifying unit
23 Notification unit
24 Estimation unit
901 CPU
902 Memory
903 Storage
904 Communication device
905 Input device
906 Output device
T Tag
T1 Known pattern
T2 Unknown pattern
R Radar device

The invention claimed is:

1. A detecting system comprising:
a tag;
a radar device, comprising one or more processors, configured to transmit transmission radio waves to the tag and to acquire reception radio waves produced by the transmission radio waves being reflected or scattered by the tag; and
a detecting apparatus connected to the radar device, wherein
the tag includes
a pattern made of a plurality of materials that reflect or scatter radio waves received from the radar device, the pattern including a known pattern known to the detecting apparatus and an unknown pattern unknown to the detecting apparatus,
wherein the radar device is configured to transmit first transmission radio waves and receive first reception radio waves produced by the first transmission radio waves being reflected or scattered by the tag,
the detecting apparatus includes
a specifying unit, comprising one or more processors, configured to calculate based on the first reception radio waves, a relative velocity between the radar device and the tag, with which the known pattern can be detected from the first reception radio waves, and to specify a condition for the radar device to transmit second transmission radio waves for estimating the unknown pattern, from the calculated relative velocity, and
a notification unit, comprising one or more processors, configured to notify the radar device of the specified condition, and
the radar device transmits the second transmission radio waves to the tag under the condition.

2. The detecting system according to claim 1, wherein
the detecting apparatus further includes
an estimation unit, comprising one or more processors, configured to estimate the unknown pattern from second reception radio waves produced by the second transmission radio waves transmitted under the condition being reflected or scattered by the tag.

3. The detecting system according to claim 1, wherein
if the tag is fixed,
the relative velocity calculated by the specifying unit is a velocity of the radar device.

4. The detecting system according to claim 1, wherein
if the tag moves,
the specifying unit is further to acquire a velocity of the radar device, and calculate a velocity of the tag from the acquired velocity of the radar device and the relative velocity.

5. The detecting system according to claim 4, wherein
if the tag floats in an environment, a velocity of the tag is a movement velocity of the environment in which the tag is located.

6. The detecting system according to claim 1, wherein the radar device is configured to perform sensing at a higher frequency in order to detect the first reception radio waves than in order to detect second reception radio waves for the second transmission radio waves.

7. The detecting system according to claim 1, wherein
the second transmission radio waves are vertically polarized waves and
the specifying unit is configured to specify the condition related to an irradiation timing to apply the vertically polarized waves, from the relative velocity between the radar device and the tag such that the radar device applies the vertically polarized waves at a distance interval of ½ of the wavelength of the vertically polarized waves.

8. A detecting apparatus comprising:
one or more processors, configured to:
   receive a first reception radio waves produced by a first transmission radio waves transmitted by a radar device being reflected or scattered by a tag including a pattern made of a plurality of materials that reflect or scatter received radio waves, the pattern including a known pattern known to the detecting apparatus and an unknown pattern unknown to the detecting apparatus;
   calculate a relative velocity between the radar device and the tag based on the first reception radio wave;
   specify a condition for the radar device to transmit a second transmission radio waves for estimating the unknown pattern, from the calculated relative velocity; and
   notify the radar device of the specified condition.

9. A detecting method in a detecting system including a tag, a radar device, and a detecting apparatus connected to the radar device, in which the tag including a pattern made of a plurality of materials that reflect or scatter radio waves received from the radar device, the pattern including a known pattern known to the detecting apparatus and an unknown pattern unknown to the detecting apparatus, the detecting method comprising:
   transmitting, by the radar device, first transmission radio waves;
   receiving, by the radar device, first reception radio waves produced by the first transmission radio waves being reflected or scattered by the tag;
   calculating, by the detecting apparatus and based on the first reception radio wave, a relative velocity between the radar device and the tag, with which the known pattern can be detected from the first reception radio waves, and specifying a condition for the radar device to transmit second transmission radio waves for estimating the unknown pattern, from the calculated relative velocity;
   notifying, by the detecting apparatus, the radar device of the specified condition; and
   transmitting, by the radar device, second transmission radio waves to the tag under the condition.

10. A non-transitory, computer-readable medium storing one or more instructions executable by a computer to perform operations as the detecting apparatus according to claim 8.

* * * * *